Aug. 19, 1924. 1,505,415
J. F. O'CONNOR
FRICTION SHOCK ABSORBING MECHANISM
Original Filed Nov. 1, 1920   2 Sheets-Sheet 2

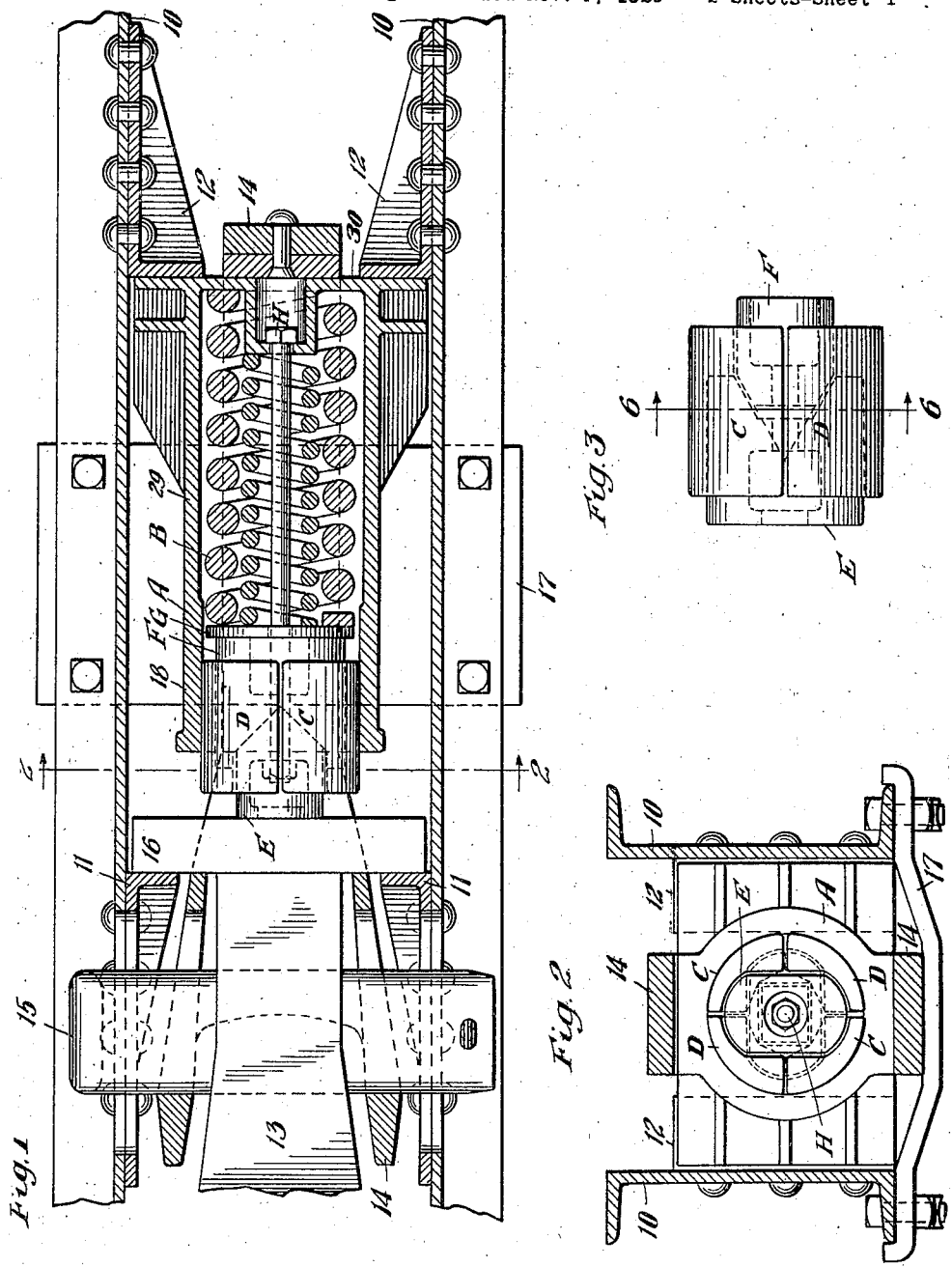

Witnesses
Wm. Geiger

Inventor
John F. O'Connor
By Geo. I. Haight
His Atty.

Patented Aug. 19, 1924.

1,505,415

UNITED STATES PATENT OFFICE.

JOHN F. O'CONNOR, OF CHICAGO, ILLINOIS, ASSIGNOR, BY MESNE ASSIGNMENTS, TO W. H. MINER, INC., A CORPORATION OF DELAWARE.

FRICTION SHOCK-ABSORBING MECHANISM.

Application filed November 1, 1920, Serial No. 421,168. Renewed February 11, 1924.

*To all whom it may concern:*

Be it known that I, JOHN F. O'CONNOR, a citizen of United States, residing at Chicago, in the county of Cook and State of Illinois, have invented a certain new and useful Improvement in Friction Shock-Absorbing Mechanisms, of which the following is a full, clear, concise, and exact description, reference being had to the accompanying drawings, forming a part of this specification.

This invention relates to improvements in friction shock absorbing mechanisms.

The object of the invention is to provide a friction shock absorbing mechanism especially adapted for railway draft riggings and wherein is obtained a compact arrangement of the movable friction elements, and provision made for use of relatively keen and blunt wedge faces to insure high capacity and certain release.

Figure 4:
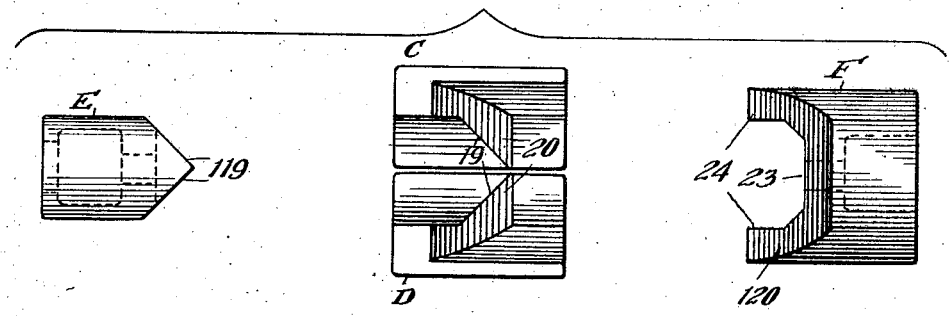
Figure 5:
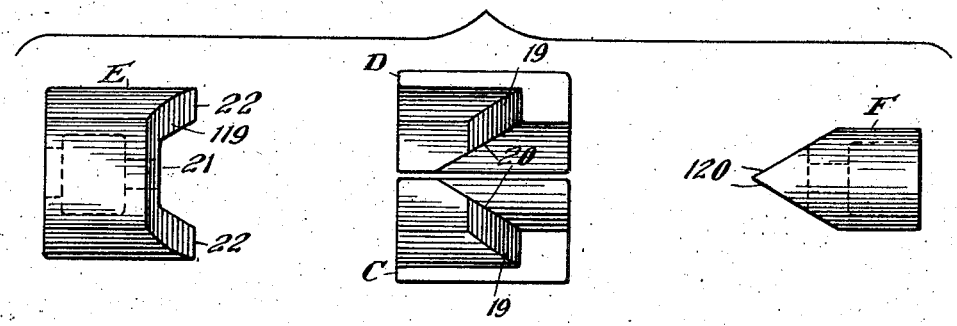
Figure 6:
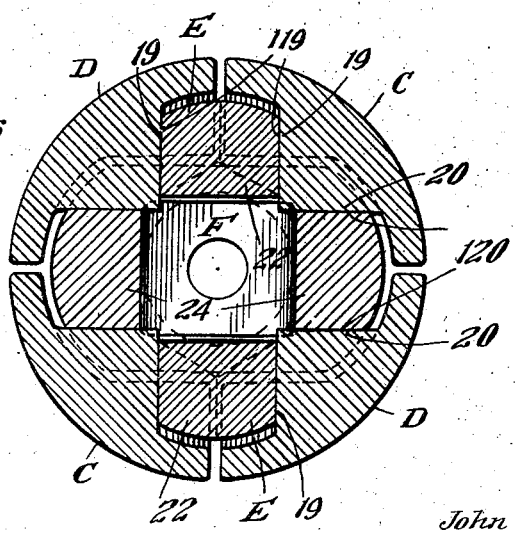

In the drawings forming a part of this specification, Figure 1 is a horizontal longitudinal sectional view of a portion of a railway draft rigging showing my improvements in connection therewith. Figure 2 is a vertical transverse sectional view corresponding substantially to the line 2—2 of Figure 1, the friction mechanism proper however, being shown in end elevation. Figure 3 is an elevational view of the friction unit, the elevation being at 90° to the showing of the same unit occurring in Figure 1. Figure 4 is a group view of the friction unit with the parts separated but showing their relative positions, only two of the friction shoes being shown. Figure 5 is a view similar to Figure 4 taken at 90° relatively thereto. And Figure 6 is an enlarged sectional view through the friction unit and corresponding substantially to the line 6—6 of Figure 3.

In said drawings, 10—10 denote channel draft sills of a railway car to the inner faces of which are secured front stop lugs 11—11 and rear stop lugs 12—12. A portion of a drawbar is indicated at 13, the same being operatively associated with the shock absorbing mechanism proper by means of a hooded cast yoke 14 and coupler key 15 arranged in the usual manner. The shock absorbing mechanism proper, hereinafter described, and a front follower 16 are disposed within the yoke. The yoke and movable parts associated therewith are supported by a detachable saddle plate 17.

The improved shock absorbing mechanism proper, as shown, comprises, broadly, a combined friction shell and spring cage casting A; a spring resistance B; two sets of friction shoes C—C and D—D; an outer wedge E; an inner wedge F; a spring follower G; and a retainer bolt H.

The casting A has the friction shell proper 18 formed at the forward end thereof, said shell having an interior cylindrical friction surface of well known form. The rear portion 29 of the casting A constitutes the spring cage and is also preferably of cylindrical form to act as a centering device for the spring resistance B. The casting A has an integral rear wall 30 laterally extended and suitably reinforced to adapt the same to act as the rear follower of the mechanism in cooperation with the said lugs 12.

The spring resistance B is or may be of well known form and comprises an outer heavy coil and an inner lighter nested coil, the same bearing at their rear ends against the rear of the casting A and at their forward ends against a disc-like spring follower G. The retainer bolt H passes through the center of the spring resistance and through suitable openings in the rear wall of the casting A, in the follower G, and wedges E and F, said bolt serving to retain the parts in assembled relation and also to hold the spring resistance under an initial compression, when desired.

Four friction shoes are shown, arranged circularly as clearly indicated in Figure 6. The diagonally disposed shoes are of like construction, that is, the shoes C—C are of like construction and the shoes D—D are of like construction. As will be understood as the description proceeds, all shoes are complementally constructed and separate descriptions for each shoe will not be necessary. Each of the shoes is formed with a rearwardly and inwardly inclined wedge face 19, the same being disposed opposite each other and having a relatively blunt included angle therebetween. The front wedge E is formed with corresponding wedge faces 119—119 adapted to engage and cooperate with said shoe-wedge faces 19—19 whereby said wedge E tends to spread the upper set of shoes C and D and the lower set C and D laterally or horizontally as viewed in Figure 6. In addition, each of the shoes is formed with another wedge face 20 inclined outwardly of the shell and toward the axis thereof. Said wedge faces 20 are also arranged in opposed pairs and have a relatively acute included angle therebetween with which are adapted to cooperate correspondingly disposed wedge faces 120—120 on the rear or inner wedge F. As will be clear from an inspection of Figure 6, the rear wedge F tends to spread the righthand pair of shoes C and D and the lefthand pair of shoes D and C vertically, that is, at right angles to the spreading action effected by the wedge E.

As best shown in Figure 5, it will be noted that the wedge E is cut out at its center as indicated at 21 so as to leave, in effect, two spaced arms 22—22, the latter having a portion of the wedge faces 119 thereon. Similarly in the case of the rear or inner wedge F, it is cut away at its center on the end adjacent the wedge E, as indicated at 23, thus leaving spaced forwardly projecting arms 24—24. The wedge faces 119 of the wedge E are angularly offset preferably 90° with respect to the wedge faces 120 on the other wedge F and by cutting away the two wedges at 21 and 23, respectively, as above described, the arms 22 and 24 are adapted to be overlapped longitudinally or lengthwise of the shell. Correspondingly the wedge faces 19 and 20 of the shoes are longitudinally overlapped so that, a section taken as in the case of Figure 6 perpendicularly to the axis of the shell, will intersect all sets of wedge faces 19, 20, 119 and 120. With this arrangement, not only am I enabled to employ relatively blunt and relatively keen wedging angles to obtain high capacity and insure release, but the friction unit is made unusually compact in a lengthwise direction which in turn enables me to employ a spring of usual length and amount of compression. The operation of the device is thought to be sufficiently clear in view of the preceding description without a further detailed explanation.

I have herein shown and described what I now consider the preferred manner of carrying out the invention but the same is merely illustrative and I contemplate all changes and modifications that come within the scope of the claims appended hereto.

I claim:

1. In a friction shock absorbing mechanism, the combination with a friction shell; of a spring resistance; and a friction unit movable as an entirety longitudinally of the shell and cooperable with the shell and spring resistance, said unit comprising, a plurality of friction shoes, an outer wedge, and an inner wedge, said outer wedge and shoes having cooperating wedge faces diverging in one direction and the inner wedge and shoes having cooperating wedge faces diverging in the opposite direction, all of said wedge faces being so relatively disposed that a sectional plane perpendicular to the axis of the shell may be taken to intersect all of them.

2. In a friction shock absorbing mechanism, the combination with a friction shell; of a spring resistance; and a friction unit movable as an entirety longitudinally of the shell and cooperable with the shell and spring resistance, said unit comprising, a plurality of friction shoes, outer wedging means having wedge faces cooperable with wedge faces on the shoes, and inner wedging means having wedge faces cooperable with other wedge faces on the shoes, all of said wedge faces being longitudinally overlapped.

3. In a friction shock absorbing mechanism, the combination with a friction shell; of a spring resistance; and a friction unit movable as an entirety longitudinally of the shell and cooperable with the shell and spring resistance, said unit comprising, a plurality of friction shoes, an outer wedge, and an inner wedge, said outer wedge having inwardly extended spaced arms and the inner wedge having outwardly extended spaced arms, said arms being longitudinally overlapped and each provided with wedge faces cooperable with wedge faces on the shoes.

4. In a friction shock absorbing mechanism, the combination with a friction shell; of a spring resistance; and a friction unit movable as an entirety longitudinally of the shell and cooperable with the shell and spring resistance, said unit comprising, a plurality of friction shoes, an outer wedge, and an inner wedge, said outer wedge and shoes having cooperating wedge faces diverging in one direction and the inner wedge and shoes having cooperating wedge faces diverging in the opposite direction, the first named set of cooperating wedge faces being angularly offset substantially 90° with respect to the second named set of cooperable wedge faces.

5. In a friction shock absorbing mechanism, the combination with a friction shell; of a spring resistance; and a friction unit cooperable with the shell and spring resistance, said unit comprising, a plurality of friction shoes movable longitudinally of the shell, an outer wedge, and an inner wedge, said outer wedge and shoes having cooperating wedge faces converged inwardly of the shell, and the inner wedge and shoes having cooperating wedge faces converged outwardly of the shell, the included angle between one set of said cooperating wedge faces being relatively blunt and the included angle between the cooperating wedge faces of the other set being relatively acute, all of said wedge faces being so relatively disposed that a sectional plane perpendicular to the axis of the shell may be taken to intersect all of them.

6. In a friction shock absorbing mechanism, the combination with a friction shell; of a spring resistance; and a friction unit cooperable with the shell and spring resistance, said unit comprising, a plurality of friction shoes, an outer wedge, and an inner wedge, said outer wedge and shoes having cooperating wedge faces converged inwardly of the shell, and the inner wedge and shoes having cooperating wedge faces converged outwardly of the shell, the included angle between one set of said cooperating wedge faces being relatively blunt and the included angle between the cooperating wedge faces of the other set being relatively acute, the last named set of cooperating wedge faces being angularly offset substantially 90° with respect to the other set of cooperating wedge faces.

7. In a friction shock absorbing mechanism, the combination with a friction shell having an interior cylindrical friction surface; of a spring resistance; a plurality of friction shoes cooperable with and movable longitudinally of said shell and arranged in a circular series therein; of an outer wedge, said wedge and shoes having cooperating wedge faces converged inwardly of the shell; and an inner wedge, said inner wedge and shoes having cooperating wedge faces converged outwardly of the shell, all of said wedge faces being longitudinally overlapped and the wedge faces of the first named set being angularly offset substantially 90° with respect to the second named set.

In witness that I claim the foregoing I have hereunto subscribed my name this 23rd day of Oct., 1920.

JOHN F. O'CONNOR.

Witness:
CARRIE GAILING.